A. REIFF.
METHOD OF ORNAMENTING.
APPLICATION FILED SEPT. 22, 1915.

1,260,050.

Patented Mar. 19, 1918.

Inventor.
Anne Reiff,
by Heard Smith & Tennant.
Atty's.

UNITED STATES PATENT OFFICE.

ANNE REIFF, OF JAMAICA PLAIN, MASSACHUSETTS.

METHOD OF ORNAMENTING.

1,260,050.     Specification of Letters Patent.     Patented Mar. 19, 1918.

Application filed September 22, 1915. Serial No. 51,962.

*To all whom it may concern:*

Be it known that I, ANNE REIFF, a citizen of the United States, residing at Jamaica Plain, county of Suffolk, State of Massachusetts, have invented an Improvement in Methods of Ornamenting, of which the following description, in connection with the accompanying drawing, is a specification, like characters on the drawing representing like parts.

This invention relates to improvements in the art of ornamentation, and has for its object the process of producing novel ornamentation and certain of the ornamental objects produced by said process. More specifically the invention consists in the production of the representation of various forms of ornamentation and including the conventional figure, representation of plant life or of fish, or of animal life by the association of the members of insects, particularly winged insects such as butterflies, moths, and the like. I am aware that heretofore ornamental articles have been produced by mounting butterflies between plates of glass, the butterflies being associated with stems of plants and fibrous material such as milk weed down, but I am not aware that the members, such as wings of insects have been associated to produce the representation of other forms of life such for example as flowers, plants, fish, or the like, meanwhile producing the velvety or iridescent effects which are peculiar to the members of insects. Another object of the invention is to provide a flexible water repellent and heat resisting transparent means for retaining the ornamental devices above described upon a suitable base such as glass, porcelain or the like which will enhance the effect of the ornamentation. The drawings illustrate certain preferred embodiments of my invention.

In the drawings, Figure 1 is a face view of a plaque or cover embodying my invention.

In producing the ornamentation in accordance with my invention the members of winged insects such as butterflies, moths, etc., are disassociated and the wings which ordinarily contain a variety of colors symmetrically disposed on each insect and similar insects of the same species are reassociated to represent flowers.

Figure 1:
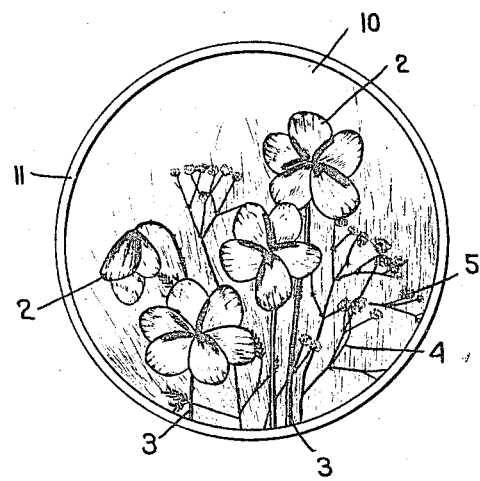

In the embodiment disclosed in Fig. 1, a base 1 is provided preferably of glass, porcelain or the like upon which is associated five of the wings 2 of butterflies of the same species arranged about a common center to produce the effect of a flower. The stem 3 of the flower may be made by the use of legs of larger insects such as grasshoppers, daddy long legs, beetles, branches of plants or grass. Similar branches 4 of the plant may be formed from the antennæ of the insects, or from hair or other suitable material. Buds or smaller flowers 5 may be formed by using the heads of insects or small insects such as ants which also may be used to represent the centers or stamens of the flower.

Figure 2:
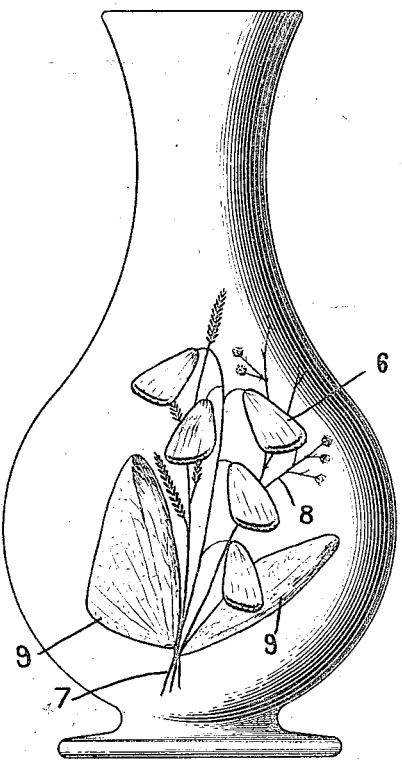
Fig. 2 is a view of a vase the curved surface of which is ornamented in accordance with my invention.
Figure 3:
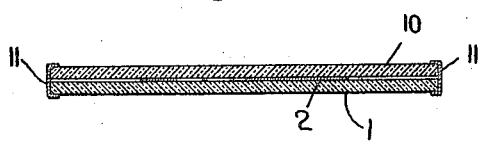
Fig. 3 is a sectional view showing the manner in which the associated members of winged insects, branches of plants and fibrous material are retained to the base.
Figure 4:
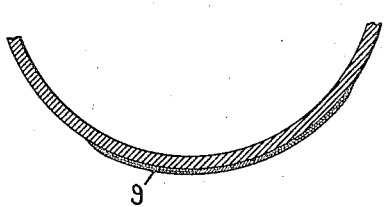
Fig. 4 is a transverse sectional view through the central portion of the vase showing the associated members of insects and of branches of plants secured thereto by a transparent covering of water repellent and heat resisting material.

In Fig. 2 a different form of ornamentation is shown in which wings 6 of butterflies are each used to represent the flower connected to a stem 7 by antennæ 8 or other suitable means, the leaves 9 being formed preferably from the wings of the grasshopper. In the particular specimens from which this illustration is made the butterfly wings 6 are of the iridescent blue having a terminal marginal line of black and slightly tipped with white, the leaves being of light green grasshopper's wings, the ensemble representing quite closely the blue bell plant and flower.

Any suitable back-ground may be utilized to display the ornamental devices more perfectly, for example, a back-ground of milk weed down or of silk fiber or other lustrous material may be used such as illustrated in Fig. 1, or the ornamental design thus produced may be applied directly to a suitable base such as the wall of a vase, bowl, dish or the cover for a jar, box or a table ornament of any desired form or design whether of a plain or curved surface.

In order to preserve the ornamental designs thus formed it is desirable that they shall be protected from the atmosphere and this may be accomplished as illustrated in Fig. 1 by placing over the same a transparent medium 10 such as glass and securing the edges to the base 1 by adhesive tape 11 or cement or other means which will hermetically seal the aperture between the cover 10 and the base 1.

Where the ornamentation instead of as above described is applied to the curved surface, the curved base as illustrated in Fig. 2, the associated members of insects, etc., may be secured to the curved surface by a covering or coating of transparent flexible water repellent and preferably heat resisting material such as collodion varnish which may be readily obtained.

In such case the varnish adheres to the surface of the insect wings and other members of the design and renders them quite flexible so that it is possible to mount such designs upon fabric thus adapting them for use in ornamenting screens, waist patterns and the like. If desired pressed insects as a whole may be mounted by this means upon fabric so that real butterfly designs may be applied to dresses for evening wear, etc.

While I have illustrated the invention as representing plants and flowers it will be understood that the invention embodies a far wider scope and that the wings of insects which in many instances are of an iridescent character may be associated to represent other forms of life, such, for example, as fish, in which the wings may be overlapped to represent the scales and by their iridescent qualities form a deceptive representation of a fish if applied to a globe or aquarium.

It is also possible to so arrange the wings of butterflies and moths as to represent other forms of life such as birds, and it will be understood that the production of such ornamentation is within the scope of my invention and that the particular forms shown in the drawings are merely illustrative and not in any manner restrictive of the scope of my invention as set forth in the following claims.

Having fully described my invention what I claim as new and desire to secure by Letters Patent is:

1. An ornamental article comprising a base, an artistic arrangement of associated members of a plurality of different insects thereupon to represent natural objects of a different form of life, and transparent means for retaining said members in associated position.

2. An ornamental article comprising a base, an artistic arrangement of associated members of a plurality of different insects thereupon to represent natural objects of a different form of life, and transparent means for retaining said members in associated position and for hermetically protecting the same from the atmosphere.

3. An ornamental article comprising a base, an artistic arrangement of the wings and other members of insects to form representation of plant life, and transparent means for retaining said members in associated position.

4. An ornamental article comprising a base and an artistic arrangement of the wings of insects to form flowers and leaves, the stems being also formed from legs and antennæ of insects.

5. An ornamental article comprising a base, a background of lustrous fibrous material thereupon and an artistic arrangement of associated members of insects upon said background to represent branches of flowers and transparent means for retaining the same in associated position.

In testimony whereof, I have signed my name to this specification.

ANNE REIFF.